United States Patent
Dong et al.

(10) Patent No.: US 11,895,014 B2
(45) Date of Patent: Feb. 6, 2024

(54) AGGREGATED ROUTE COMMUNICATION METHOD AND APPARATUS

(71) Applicant: Huawei Technologies Co., Ltd., Shenzhen (CN)

(72) Inventors: Jiajia Dong, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/724,886

(22) Filed: Apr. 20, 2022

(65) Prior Publication Data
US 2022/0247670 A1     Aug. 4, 2022

Related U.S. Application Data

(63) Continuation of application No. PCT/CN2020/117139, filed on Sep. 23, 2020.

(30) Foreign Application Priority Data

Oct. 22, 2019   (CN) .......................... 201911008408.2
Oct. 30, 2019   (CN) .......................... 201911046892.8
Nov. 19, 2019   (CN) .......................... 201911137412.9

(51) Int. Cl.
    *H04L 45/24*        (2022.01)
    *H04L 45/17*        (2022.01)
    *H04L 45/00*        (2022.01)

(52) U.S. Cl.
    CPC .............. *H04L 45/24* (2013.01); *H04L 45/17* (2022.05); *H04L 45/22* (2013.01)

(58) Field of Classification Search
CPC .......... H04L 45/24; H04L 45/22; H04L 45/16
See application file for complete search history.

(56) References Cited

U.S. PATENT DOCUMENTS 6,603,756 B1 *   8/2003   Tappan ................... H04L 45/04
                                               370/399
8,078,758 B1 *   12/2011   Callon .................... H04L 45/00
                                               709/239

(Continued)

FOREIGN PATENT DOCUMENTS

CN     101645845 A     2/2010
CN     101692654 A     4/2010

(Continued)

OTHER PUBLICATIONS

C. Filsfils et al, "SRv6 Network Programming," draft-ietf-spring-srv6-network-programming-01, Jul. 3, 2019, 47 pages.

(Continued)

*Primary Examiner* — Jimmy H Tran
(74) *Attorney, Agent, or Firm* — Conley Rose, P.C.

(57) ABSTRACT

A communication method includes a first network device obtaining a first route and a second route from a second network device. A first network segment corresponding to the first route is a subnet segment of a second network segment corresponding to the second route. The second route is an aggregated route, and the first route indicates that the first network segment is unreachable. The first network device switches a next hop of the aggregated route based on the first route.

20 Claims, 3 Drawing Sheets

(56) References Cited

U.S. PATENT DOCUMENTS

| | | | | |
|---|---|---|---|---|
| 8,170,033 | B1* | 5/2012 | Kothari | H04L 45/033 |
| | | | | 370/395.53 |
| 8,953,590 | B1* | 2/2015 | Aggarwal | H04L 12/4675 |
| | | | | 370/409 |
| 9,019,815 | B2 | 4/2015 | Eckert et al. | |
| 9,660,897 | B1* | 5/2017 | Gredler | H04L 45/50 |
| 10,069,725 | B1* | 9/2018 | Talur | H04L 45/021 |
| 10,230,605 | B1 | 3/2019 | Filsfils et al. | |
| 10,454,822 | B2* | 10/2019 | Nainar | H04L 45/74 |
| 10,887,225 | B1* | 1/2021 | Chan | H04L 12/4633 |
| 2005/0220123 | A1* | 10/2005 | Wybenga | H04L 45/02 |
| | | | | 370/400 |
| 2007/0258447 | A1* | 11/2007 | Raszuk | H04L 45/04 |
| | | | | 370/389 |
| 2008/0320166 | A1* | 12/2008 | Filsfils | H04L 45/04 |
| | | | | 709/242 |
| 2009/0003348 | A1 | 1/2009 | Kulkarni et al. | |
| 2010/0074268 | A1* | 3/2010 | Raza | H04L 45/02 |
| | | | | 370/400 |
| 2010/0271933 | A1 | 10/2010 | Li et al. | |
| 2011/0194561 | A1* | 8/2011 | Kompella | H04L 61/10 |
| | | | | 370/392 |
| 2011/0228785 | A1* | 9/2011 | Filsfils | H04L 45/03 |
| | | | | 370/395.31 |
| 2011/0286466 | A1* | 11/2011 | Ge | H04L 45/741 |
| | | | | 370/401 |
| 2012/0281520 | A1* | 11/2012 | Ansari | H04L 45/00 |
| | | | | 370/216 |
| 2013/0301403 | A1 | 11/2013 | Esale et al. | |
| 2015/0304206 | A1* | 10/2015 | Filsfils | H04L 45/46 |
| | | | | 709/238 |
| 2015/0312055 | A1* | 10/2015 | Varga | H04L 45/04 |
| | | | | 370/254 |
| 2016/0173363 | A1* | 6/2016 | Torvi | H04L 45/02 |
| | | | | 370/401 |
| 2017/0163530 | A1* | 6/2017 | Drake | H04L 45/66 |
| 2017/0195210 | A1* | 7/2017 | Jacob | H04L 45/02 |
| 2018/0034648 | A1* | 2/2018 | Nagarajan | H04L 45/033 |
| 2018/0176134 | A1* | 6/2018 | Pignataro | H04L 67/10 |
| 2018/0351857 | A1* | 12/2018 | Vairavakkalai | H04L 63/0272 |
| 2018/0351862 | A1* | 12/2018 | Jeganathan | H04L 45/586 |
| 2018/0351863 | A1* | 12/2018 | Vairavakkalai | H04L 45/50 |
| 2018/0351864 | A1* | 12/2018 | Jeganathan | H04L 45/021 |
| 2018/0351882 | A1* | 12/2018 | Jeganathan | H04L 12/4641 |
| 2018/0375684 | A1 | 12/2018 | Filsfils et al. | |
| 2019/0190885 | A1* | 6/2019 | Krug | H04L 61/2517 |
| 2020/0014557 | A1* | 1/2020 | Wang | H04L 45/02 |
| 2020/0021523 | A1* | 1/2020 | Wang | H04L 12/4633 |
| 2020/0287826 | A1 | 9/2020 | Wang | |
| 2020/0296025 | A1 | 9/2020 | Wang | |
| 2021/0036951 | A1* | 2/2021 | Heron | H04L 45/50 |
| 2021/0083963 | A1* | 3/2021 | Szarecki | H04L 45/04 |
| 2021/0399985 | A1* | 12/2021 | Chen | H04L 45/566 |
| 2022/0360527 | A1* | 11/2022 | Wang | H04L 12/46 |

FOREIGN PATENT DOCUMENTS

| | | |
|---|---|---|
| CN | 103391247 A | 11/2013 |
| CN | 103581025 A | 2/2014 |
| CN | 104270310 A | 1/2015 |
| CN | 106034072 A | 10/2016 |
| CN | 107154888 A | 9/2017 |
| CN | 107347032 A | 11/2017 |
| CN | 108449276 A | 8/2018 |
| CN | 109861926 A | 6/2019 |
| EP | 3454510 A1 | 3/2019 |
| EP | 3713162 A1 | 9/2020 |
| WO | 2019105066 A1 | 6/2019 |

OTHER PUBLICATIONS

J. Xie et al, "BIER IPv6 Encapsulation (BIERv6) Support via IS-IS," raft-xie-bier-ipv6-isis-extension-00, Jul. 1, 2019, 8 pages.

RFC 7684, P. Psenak, et al, "OSPFv2 Prefix/Link Attribute Advertisement," Nov. 2015, 15 pages.

RFC 7794, L. Ginsberg, Ed. et al, "IS-IS Prefix Attributes for Extended IPv4 and IPv6 Reachability," Mar. 2016, 9 pages.

* cited by examiner

AGGREGATED ROUTE COMMUNICATION METHOD AND APPARATUS

CROSS-REFERENCE TO RELATED APPLICATIONS

This is a continuation of International Patent Application No. PCT/CN2020/117139 filed on Sep. 23, 2020, which claims priority to Chinese Patent Application No. 201911008408.2 filed on Oct. 22, 2019, Chinese Patent Application No. 201911046892.8 filed on Oct. 30, 2019, and Chinese Patent Application No. 201911137412.9 filed on Nov. 19, 2019. All of the aforementioned patent applications are hereby incorporated by reference in their entireties.

TECHNICAL FIELD

This application relates to the communications field, and in particular, to a communication method and apparatus.

BACKGROUND

With development of communications technologies, a communications network has an increasing scale, leading to an increasing amount of data in a routing information base (RIB) stored in a network device. To reduce the data amount of the RIB, an aggregated route emerges. A plurality of specific routes are aggregated into one aggregated route, so that one aggregated route may correspond to a network segment rather than a network device. This effectively reduces the data amount of the RIB.

However, after the aggregated route is introduced, in some scenarios, a relatively serious packet loss may be caused in a data packet forwarding process. Therefore, a solution is urgently needed to resolve this problem.

SUMMARY

Embodiments of this application provide a communication method, to resolve a problem of a relatively high packet loss rate caused by introduction of an aggregated route.

According to a first aspect of the embodiments of this application, a communication method includes a first network device obtaining a first route, a second route, and a third route from a second network device. The third route includes a network segment route corresponding to a Segment Routing over Internet Protocol version 6 segment identifier (SRV6 SID), the network segment corresponding to the third route is a subnet segment of a network segment corresponding to the first route, the network segment corresponding to the third route is a subnet segment of a network segment corresponding to the second route, and the network segment corresponding to the first route is a subnet segment of the network segment corresponding to the second route. The first network device sets an outbound interface of the first route to a null0 outbound interface.

With the method, a mask length of the third route is greater than a mask length of the first route, and the mask length of the first route is greater than a mask length of the second route. Therefore, when performing route iteration, the first network device may first obtain the third route through matching based on a longest mask matching rule. In a conventional technology, once the third route is unreachable, for example, the second network device is faulty and causes the third route to be unreachable, the third route is deleted. However, the second route is not deleted along with the third route. Therefore, based on the longest mask matching rule, the first network device obtains the second route through matching. In this embodiment of this application, the first route is introduced, and the mask length of the first route is greater than the mask length of the second route, so that when the third route is unreachable, the first network device may obtain the first route through matching. Because the outbound interface of the first route is a null0 outbound interface, after route iteration on the first route, the first network device may quickly determine that a next hop is unreachable, and the first network device may perform another operation, for example, switching to a backup next hop for route iteration, so that when a packet is forwarded, the packet may be forwarded by using a path indicated by another route. This reduces a packet loss rate.

In a possible implementation, if the first network device is configured to perform Border Gateway Protocol Virtual Private Network version 4 (BGP VPNv4) route iteration by using a loopback interface address route, and determine an outbound interface and a next hop based on the loopback interface address route, the third route may include the loopback interface address route in addition to a locator route. In this way, with the solution in this embodiment of this application, even if the first network device is configured to perform BGP VPNv4 route iteration by using a loopback interface address route, fast switching of a packet forwarding path can be implemented, to effectively reduce a packet loss rate.

In a possible implementation, when the first network device specifically sets the outbound interface of the first route to the null0 outbound interface, for example, the first network device may set the outbound interface of the first route to the null0 outbound interface based on a first identifier, and the first identifier may be sent by the second network device to the first network device. The first identifier may be sent by the second network device to the first network device by using another message independent of the first route, or may be added to the first route and sent to the first network device by the second network device. This is not specifically limited in this embodiment of this application.

In a possible implementation, in a layer 3 virtual private network (L3VPN) over Segment Routing over Internet Protocol version 6 (SRv6) scenario, anSRv6 label-switched path (LSP) needs to be established first, and a private network route needs to be learned by using a virtual private network (VPN) instance. Therefore, the VPN instance is configured on both the first network device and the second network device, a Border Gateway Protocol (BGP) peer relationship is pre-established between the first network device and the second network device, and both the first network device and the second network device support the SRv6.

In a possible implementation, considering that the outbound interface of the first route is a null0 outbound interface, once the first route is obtained through matching, it is considered that the network segment corresponding to the first route is unreachable. If the first route includes a specific route in another management domain, the specific route in the other management domain is caused to be also unreachable. To avoid this problem, the first route does not include a specific route in another management domain. That is, the first route does not include a specific route in a second Interior Gateway Protocol (IGP) domain. The second IGP domain is another management domain different from a first IGP domain in which the first network device and the second network device are located, that is, the second IGP domain does not include a network device in the first IGP domain.

In a possible implementation, the first route, the second route, and the third route may be sent by the second network device to the first network device by using an Intermediate System-to-Intermediate System (IS-IS) protocol or an Open Shortest Path First (OSPF) protocol.

In a possible implementation, the first network device may further receive a fourth route from a third network device. In an L3VPN over SRv6 dual-homing scenario, an access side device may be dual-homed to the third network device and the second network device. In a Segment Routing-Traffic Engineering Fast Reroute (SR-TE FRR) scenario, the fourth route may be a backup route, determined by using a Fast Reroute (FRR) method, of the third route. In this way, after obtaining the null0 outbound interface through matching, the first network device may further perform route next-hop switching, for example, may trigger route next-hop switching to the third network device, so that in a packet forwarding process, another route such as the fourth route may be used to determine a packet forwarding path, thereby implementing fast switching of a packet forwarding path, to effectively reduce a packet loss rate.

According to a second aspect of the embodiments of this application, a communication method is provided. Specifically, a first network device obtains a third route from a second network device. The third route includes a network segment route corresponding to an SRv6 SID. When determining that the third route is unreachable, the first network device sets an outbound interface of the third route to a null0 outbound interface. The first network device deletes the third route after waiting a preset time.

With the method, when performing route iteration, the first network device may first obtain the third route through matching based on a longest mask matching rule. In a conventional technology, once the third route is unreachable, for example, the second network device is faulty and causes the third route to be unreachable, the third route is deleted. In this embodiment of this application, when determining that the third route is unreachable, the first network device sets the outbound interface of the third route to the null0 outbound interface, and deletes the third route after waiting the preset time. In this way, even though the third route is unreachable, the first network device still obtains the third route through matching. In addition, because the outbound interface of the first route is a null0 outbound interface, after obtaining the third route through matching, the first network device may quickly determine that a next hop is actually unreachable, and the first network device may perform another operation, for example, switching to a backup next hop for route iteration, so that when a packet is forwarded, the packet is forwarded by using a path indicated by another route. This reduces a packet loss rate.

In a possible implementation, if the first network device is configured to perform BGP VPNv4 route iteration by using a loopback interface address route, and determine an outbound interface and a next hop based on the loopback interface address route, the third route may include the loopback interface address route in addition to a locator route. In this way, with the solution in this embodiment of this application, even if the first network device is configured to perform BGP VPNv4 route iteration by using a loopback interface address route, fast switching of a packet forwarding path can be implemented, to effectively reduce a packet loss rate.

In a possible implementation, the first network device may obtain a second route from the second network device. A network segment corresponding to the third route is a subnet segment of a network segment corresponding to the second route. The second route mentioned herein may be an aggregated route.

In a possible implementation, when determining that the third route is unreachable, the first network device may set the outbound interface of the third route to the null0 outbound interface based on a second identifier. The second identifier may be sent by the second network device to the first network device. Specifically, the second identifier may be sent by the second network device to the first network device by using another message independent of the third route, or may be added to the third route and sent to the first network device by the second network device. This is not specifically limited in this embodiment of this application.

In a possible implementation, when the second network device sends the third route to the first network device by using an IS-IS protocol or an OSPF protocol, the second network device may add the second identifier to a field in an IS-IS packet or an OSPF packet.

In a possible implementation, in an L3VPN over SRv6 scenario, an SRv6 LSP needs to be established first, and a private network route needs to be learned by using a VPN instance. Therefore, the VPN instance is configured on both the first network device and the second network device, a BGP peer relationship is pre-established between the first network device and the second network device, and both the first network device and the second network device support the SRv6.

In a possible implementation, the first network device may further receive a fourth route from a third network device. In an L3VPN over SRv6 dual-homing scenario, an access side device may be dual-homed to the third network device and the second network device. In an SR-TE FRR scenario, the fourth route may be a backup route, determined by using an FRR method, of the third route. In this way, after obtaining the null0 outbound interface through matching, the first network device may further perform route next-hop switching, for example, may trigger route next-hop switching to the third network device, so that in a packet forwarding process, another route such as the fourth route may be used to determine a packet forwarding path, thereby implementing fast switching of a packet forwarding path, to effectively reduce a packet loss rate.

According to a third aspect, an embodiment of this application provides a communications apparatus. The apparatus includes: an obtaining unit, configured to obtain a first route, a second route, and a third route from a second network device, where the third route includes a network segment route corresponding to a segment identifier SRv6 SID of a segment routing Internet protocol version 6, the network segment corresponding to the third route is a subnet segment of a network segment corresponding to the first route, the network segment corresponding to the third route is a subnet segment of a network segment corresponding to the second route, and the network segment corresponding to the first route is a subnet segment of the network segment corresponding to the second route; and a setting unit, configured to set an outbound interface of the first route to a null0 outbound interface.

In a possible implementation, the third route further includes a loopback interface address route.

In a possible implementation, the apparatus further includes: a first receiving unit, configured to receive a first identifier from the second network device; and the setting unit is specifically configured to: set the outbound interface of the first route to the null0 outbound interface based on the first identifier.

In a possible implementation, the communications apparatus is applied to a first network device, a VPN instance is configured on both the first network device and the second network device, a BGP peer relationship is pre-established between the first network device and the second network device, and both the first network device and the second network device support the SRv6.

In a possible implementation, the communications apparatus is applied to a first network device, the first network device and the second network device are located in a first IGP domain, and a second IGP domain does not include a network device in the first IGP domain, and the first route does not include a specific route located in the second IGP domain.

In a possible implementation, the obtaining unit is specifically configured to: receive the first route, the second route, and the third route that are sent by the second network device by using an IS-IS protocol or an OSPF protocol.

In a possible implementation, the apparatus further includes: a second receiving unit, configured to receive a fourth route from a third network device, where an access side device is dual-homed to the third network device and the second network device, or the fourth route is a backup route, determined by using an FRR apparatus, of the third route.

According to a fourth aspect, an embodiment of this application provides a communications apparatus. The apparatus includes: a first obtaining unit, configured to obtain a third route from a second network device, where the third route includes a network segment route corresponding to an SRv6 SID; a setting unit, configured to: when it is determined that the third route is unreachable, set an outbound interface of the third route to a null0 outbound interface; and a deleting unit, configured to delete the third route after waiting a preset time.

In a possible implementation, the third route further includes a loopback interface address route.

In a possible implementation, the apparatus further includes: a second obtaining unit, configured to obtain a second route from the second network device, where a network segment corresponding to the third route is a subnet segment of a network segment corresponding to the second route.

In a possible implementation, the communications apparatus is applied to a first network device, a VPN instance is configured on both the first network device and the second network device, a BGP peer relationship is pre-established between the first network device and the second network device, and both the first network device and the second network device support the SRv6.

In a possible implementation, the apparatus further includes: a receiving unit, configured to receive a fourth route from a third network device, where an access side device is dual-homed to the third network device and the second network device, or the fourth route is a backup route, determined by using an FRR apparatus, of the third route.

According to a fifth aspect, an embodiment of this application provides a communications device, including a processor and a memory. The memory is configured to store a program. The processor is configured to execute the program in the memory, to perform the method according to the first aspect, or perform the method according to the second aspect.

According to a sixth aspect, an embodiment of this application provides a computer-readable storage medium, including a program. When the program runs on a computer, the computer is enabled to perform the method according to the first aspect, or perform the method according to the second aspect.

According to a seventh aspect, an embodiment of this application provides a computer program product including a program. When the program runs on a computer, the computer is enabled to perform the method according to the first aspect, or perform the method according to the second aspect.

BRIEF DESCRIPTION OF DRAWINGS

To describe the technical solutions in the embodiments of this application or other approaches more clearly, the following briefly describes the accompanying drawings for describing the embodiments. It is clearly that the accompanying drawings in the following description show some embodiments of this application, and persons of ordinary skill in the art may still derive other drawings from these accompanying drawings without creative efforts.

DESCRIPTION OF EMBODIMENTS

Embodiments of this application provide a communication method, to resolve a problem of a relatively high packet loss rate caused by introduction of an aggregated route.

For ease of understanding, a possible application scenario of the embodiments of this application is described first.

Figure 1:
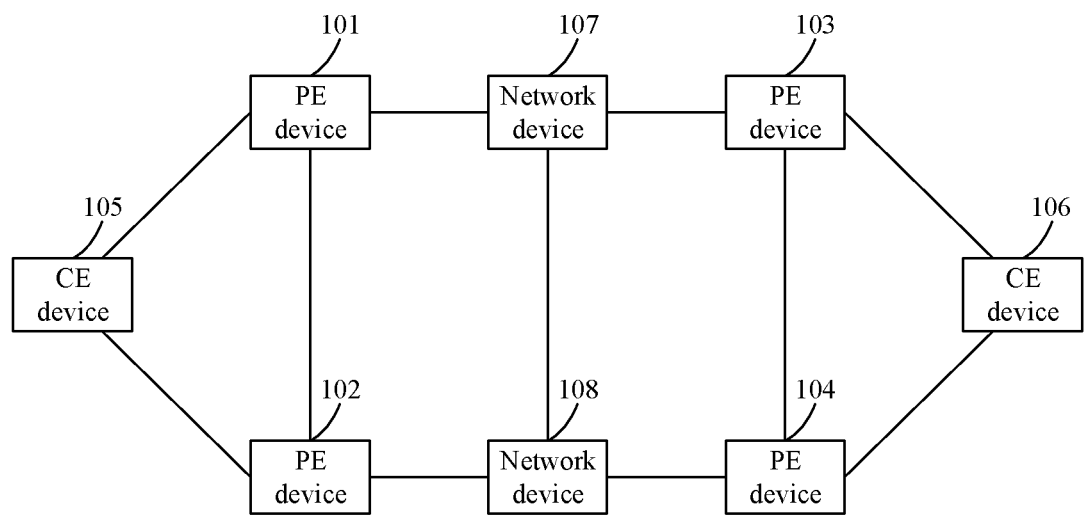
FIG. 1 is a schematic diagram of an application scenario according to an embodiment of this application.

FIG. 1 is a schematic diagram of an application scenario according to an embodiment of this application. The scenario shown in FIG. 1 is a scenario of an L3VPN based on an SRv6, which is referred to as an L3VPN over SRv6 for short. In the scenario shown in FIG. 1, both a provider edge (PE) device 101 and a PE device 102 are connected to a customer edge (CE) device 105, and the PE device 101 is connected to the PE device 102. The PE device 101 is connected to a PE device 103 by using a network device 107. The PE device 102 is connected to a PE device 104 by using a network device 108. The network device 107 is connected to the network device 108, the PE device 103 is connected to the PE device 104, and both the PE device 103 and the PE device 104 are connected to a CE device 106. The PE device 101, the PE device 102, the PE device 103, the PE device 104, the network device 107, and the network device 108 are located in one management domain. In addition, FIG. 1 is merely shown for ease of understanding, and does not constitute a limitation on the embodiments of this application. Actually, a network device between the PE device 101 and the PE device 103 may include another network device in addition to the network device 107. Similarly, a network device between the PE device 102 and the PE device 104 may include another network device in addition to the network device 108.

The L3VPN over SRv6 means using an SRv6 LSP of a public network to carry Internet Protocol version 4 (IPv4) or Internet Protocol version 6 (IPv6) VPN private network data. It can be understood that, if to use the SRv6 LSP to carry the IPv4 VPN private network data or the IPv6 VPN private network data, the SRv6 LSP needs to be established first, and a private network route needs to be learned by using a VPN instance. The following description is provided with reference to FIG. 1.

The following describes a process of route transfer between the PE device 101 and the PE device 103. A process of route transfer between the PE device 102 and the PE device 104 is similar thereto. Specifically, both the PE device 101 and the PE device 103 support the SRv6. A BGP peer relationship is established between the PE device 103 and the PE device 101, and a VPN instance is configured on the PE device 103 and the PE device 101. Specifically, if to use an SRv6 LSP to carry IPv4 VPN private network data, a VPNv4 instance may be configured on the PE device 103 and the PE device 101. If to use an SRv6 LSP to carry IPv6 VPN private network data, a VPNv6 instance may be configured on the PE device 103 and the PE device 101. This is not limited herein. The following uses the VPNv4 instance as an example for description.

If the CE device 106 advertises a private network route, for example, 10.1.1.0/24, the PE device 103 may first introduce the VPN instance private network route 10.1.1.0/24 by using the BGP. Then, the PE device 103 converts the VPN instance private network route into a BGP VPNv4 route, and advertises the route to the PE device 101 by using the BGP peer relationship. That is, the PE device 101 learns the route 10.1.1.0/24 by using the BGP, and determines that a next hop is a loopback interface address of the PE device 103. For example, the loopback address is A1:1:13::3. Correspondingly, the VPN instance on the PE device 101 may also learn the route. However, because a VPN segment identifier (SID) is configured on the PE device 103, a next hop of the route learned by the VPN instance on the PE 101 is a VPN SID. For example, the VPN SID is A1:1:3::B100. That is, the PE device 101 may learn two routes from the PE device 103, as shown in the following Table 1.

TABLE 1

| Sequence number | Route type | Address prefix | Next hop |
| --- | --- | --- | --- |
| 1 | BGP VPNv4 route | 10.1.1.0/24 | A1:1:13::3 |
| 2 | VPN route | 10.1.1.0/24 | A1:1:3::B100 |

The BGP VPNv4 route in Table 1 is the route learned by the PE device 101 from the PE device 103 by using the BGP, and the VPN route is the route learned by the VPN instance on the PE device 101 from the PE device 103. After learning the VPNv4 route, the PE device 101 may cross the route into a corresponding VPN instance routing table, then convert the route into a common IPv4 route, and advertise the route to the CE device 105. In this way, a reachable route is implemented between the CE device 105 and the CE device 106. In addition, because both the PE device 101 and the PE device 103 support the SRv6, the PE device 103 may further send, to the PE device 101, a network segment route corresponding to an SRv6 SID of the PE device 103. The route is also referred to as a locator route. A packet may also be forwarded between the PE device 101 and the PE device 103 by using the locator route. For example, the locator route of the PE device 103 is A1:1:3::/64. The locator route may be shown in Table 2.

TABLE 2

| Route type | Destination address | Next hop |
| --- | --- | --- |
| Locator route | A1:1:3::/64 | A1:1:13::7 |

For example, A1:1:13::7 may be a loopback interface address of the network device 107 shown in FIG. 1, that is, it indicates that a next hop is the network device 107.

When the CE device 105 sends a packet to the CE device 106, the CE device 105 sends a common IPv4 packet whose destination address is the CE device 106 to the PE device 101, that is, the destination address of the IPv4 packet is 10.1.1.0/24. After receiving the common IPv4 packet from an interface bound to the VPN instance, the PE device 101 may encapsulate the IPv4 packet into an SRv6 packet by using the BGP VPNv4 route or the VPN route in Table 1 for further forwarding. The VPN route is used as an example. The PE device 101 searches a routing and forwarding table of a corresponding VPN instance, and performs destination IPv4 prefix matching, to find an associated VPN SID and next hop information. Then, the VPN SID A1:1:3::B100 is directly used as a destination address of the packet, to encapsulate the packet into an SRv6 packet. The PE device 101 obtains the locator route A1:1:3::/64 through matching with the destination address based on a longest matching rule, and forwards the packet to the network device 107 along a shortest path. The network device 107 obtains the locator route A1:1:3::/64 through matching based on the longest matching rule, and forwards the packet to the PE device 103 along a shortest path. The PE device 103 determines a corresponding forwarding action based on the VPN SID A1:1:3::B100, decapsulates the SRv6 packet, restores the packet to the common IPv4 packet, then obtains a VPN instance through matching with the VPN SID A1:1:3::B100, searches a routing table of the VPN instance, and sends the restored common IPv4 packet to the CE device 106, to complete packet forwarding.

A specific process in which the PE device 101 encapsulates the IPv4 packet into an SRv6 packet by using the BGP VPNv4 route and further forwards the SRv6 packet is similar to the foregoing description, and details are not described herein again.

With reference to the application scenario shown in FIG. 1, the CE device 105 is connected to the PE device 101 and the PE device 102, and the CE device 106 is connected to the PE device 103 and the PE device 104. The PE device 101 and the PE device 102 may be two devices that implement L3VPN dual-homing access, that is, the CE device 105 is dual-homed to the PE device 101 and the PE device 102. The PE device 103 and the PE device 104 may also be devices that implement L3VPN dual-homing access, that is, the CE device 106 is dual-homed to the PE device 103 and the PE device 104. Alternatively, the PE device 101 and the PE device 102 may be two devices that implement FRR. For example, a packet forwarding path including the PE device 102 is an FRR path including a packet forwarding path of the PE device 101. Alternatively, the PE device 103 and the PE device 104 may be two devices that implement FRR. For example, a packet forwarding path including the PE device 104 is an FRR path including a packet forwarding path of the PE device 103.

In the foregoing scenarios, in addition to the routes to the PE device 103, the PE device 101 further has routes to the PE device 104, for example, a BGP VPNv4 route, a VPN route, and a locator route to the PE device 104 that are shown in Table 3 and Table 4. According to a dual-homing access protocol or an FRR protocol between the PE device 103 and the PE device 104, when the PE device 103 is unreachable, the PE device 101 may replace a route to the PE device 103 with a route to the PE device 104 for further packet forwarding.

TABLE 3

| Sequence number | Route type | Address prefix | Next hop |
|---|---|---|---|
| 1 | BGP VPNv4 route | 10.1.1.0/24 | A1:1:14::4 |
| 2 | VPN route | 10.1.1.0/24 | A1:1:4::B100 |

TABLE 4

| Route type | Destination address | Next hop |
|---|---|---|
| Locator route | A1:1:4::/64 | A1:1:13::8 |

For example, A1:1:13::8 may be a loopback interface address of the network device 108 shown in FIG. 1, that is, it indicates that a next hop is the network device 108.

The PE device 103 and the PE device 104 may both introduce an aggregated route, for example, A1::/32. A network segment corresponding to the locator route is a subnet segment of a network segment corresponding to the aggregated route. When the locator route A1:1:3::/64 is unreachable, for example, the PE device 103 is faulty and causes the locator route A1:1:3::/64 to be unreachable, the PE device 101 may quickly detect, by using an IGP, that the locator route is unreachable, that is, the PE device 101 may determine that the locator route actually does not exist. Therefore, the PE device 101 may immediately delete the locator route. However, the aggregated route is not deleted because the PE device 104 also introduces the aggregated route. In addition, the PE device 101 has not detected that a BGP connection between the PE device 101 and the PE device 103 is interrupted, because it takes some time to perform connection interruption detection by using the BGP. Therefore, for the BGP VPNv4 route and the VPN route shown in Table 1, when route iteration is performed by using the next hop VPN SID A1:1:3::B100 of the VPN route or the next hop loopback interface address A1:1:13::3 of the BGP VPNv4 route, the aggregated route A1:132 is obtained through matching based on the longest mask matching rule, that is, the route iteration succeeds due to the next hop (the PE device 103) of the private network route 10.1.1.0/24. The PE device 101 considers that an SRv6 tunnel between the PE device 101 and the PE device 103 is still reachable, and does not trigger route next-hop switching to the PE device 104. As a result, during packet forwarding, a packet (for example, a common IPv4 packet from the CE device 105) is still encapsulated into an SRv6 packet with the VPN SID A1:1: 3::B100 corresponding to the PE 103 as a destination address, leading to a serious packet loss.

It should be noted herein that, each network device such as the PE device 101 shown in FIG. 1 performs route iteration based on a preset period, to determine whether a route is reachable, updates a RIB based on a route iteration result, and correspondingly updates, based on an updated RIB, a forwarding information base (FIB) for guiding packet forwarding. In a packet forwarding process, the PE device 101 forwards a packet based on the latest FIB. In the foregoing scenario, when performing route iteration, the PE device 101 does not trigger VPN route next hop switching in time, so that an actually unreachable route exists in the FIB. As a result, when forwarding a packet, the packet is forwarded along the actually unreachable route, leading to a serious packet loss.

To resolve the foregoing problem, an embodiment of this application provides a communication method. The following describes the method with reference to an accompanying drawing.

Figure 2:
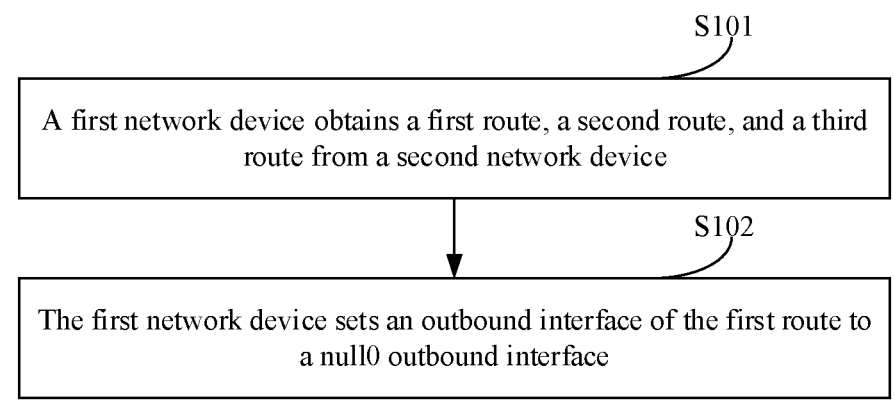
FIG. 2 is a schematic flowchart of a communication method according to an embodiment of this application.

FIG. 2 is a schematic flowchart of a communication method according to an embodiment of this application. The communication method provided in this embodiment of this application may be implemented, for example, by performing the following S101 and S102.

S101: A first network device obtains a first route, a second route, and a third route from a second network device.

In this embodiment of this application, the first network device may be a router, or may be a switch. Correspondingly, the second network device may also be a router or a switch. In an L3 VPN over SRv6 scenario, the first network device and the second network device may be PE devices. For example, the first network device may correspond to the PE device 101 shown in FIG. 1, and the second network device may correspond to the PE device 103 shown in FIG. 1. In an SR-TE FRR scenario, the first network device and the second network device may be not PE devices, but may be any network nodes in a network.

It can be understood that, in the L3VPN over SRv6 scenario, an SRv6 LSP needs to be established first, and a private network route needs to be learned by using a VPN instance. Therefore, the VPN instance is configured on both the first network device and the second network device, a BGP peer relationship is pre-established between the first network device and the second network device, and both the first network device and the second network device support the SRv6.

In this embodiment of this application, the third route may include a network segment route corresponding to an SRv6 SID, that is, a locator route, and the third route may be considered as a public network route. When the second network device supports the SRv6, the second network device has a network segment route corresponding to the SRv6 SID. In a possible implementation, if the first network device is configured to perform BGP VPNv4 route iteration by using a loopback interface address route, and determine an outbound interface and a next hop based on the loopback interface address route, the third route may include the loopback interface address route in addition to the locator route. In this embodiment of this application, the first network device and the second network device are located in a same IGP domain. Therefore, the first network device may learn the third route by using the IGP, that is, the second network device may advertise the third route to the first network device by using the IGP. For example, the second network device may send the third route to the first network device by using an IS-IS protocol. For another example, the second network device may send the third route to the first network device by using an OSPF protocol. In this embodiment of this application, the second route is an aggregated route introduced on the second network device, and a network segment corresponding to the second route includes a network segment corresponding to the third route. In other words, the network segment corresponding to the third route is a subnet segment of the network segment corresponding to the second route.

It can be understood that, in an actual application, because the first network device and the second network device are located in the same IGP domain, the first network device may determine, by using the IGP, whether the third route is reachable. When the first network device determines that the third route is unreachable, the first network device may delete the third route. However, in an actual application, the first network device cannot determine whether a BGP connection between the first network device and the second network device is interrupted, because it takes some time to detect whether the BGP connection is interrupted. Therefore, even if the first network device has determined that the third route is unreachable, the first network device does not delete the BGP VPNv4 route and the VPN route that are shown in Table 1. Therefore, when performing route next-hop iteration, the first network device may obtain the second route through matching in a longest mask matching manner, and consider that the route next-hop iteration succeeds, and does not trigger route next-hop switching. As a result, a routing and forwarding table includes an actually unreachable route, leading to a relatively serious packet loss. It is understood with reference to FIG. 1 that, when route next-hop iteration is performed by using the next hop VPN SID A1:1:3::B100 of the VPN route, the second route A1::/32 is obtained through matching based on a longest mask matching rule. It is considered that the next hop PE device 103 is reachable, and next hop switching to the PE device 104 is not triggered.

In view of this, in this embodiment of this application, when advertising the second route to the first network device, the second network device may further advertise a blackhole route. The blackhole route refers to a route whose outbound interface is a null0 outbound interface. Once the blackhole route is obtained through matching during route iteration, it may be determined that a next hop is unreachable. The first route mentioned in this embodiment of this application is a blackhole route. Specifically, the second network device may advertise the first route and the second route to the first network device by using the IGP. In this embodiment of this application, the IGP protocol used by the second network device to advertise the first route and the second route to the first network device is not specifically limited. In an example, the second network device may advertise the first route and the second route to the first network device by using the IS-IS protocol. In another example, the second network device may advertise the first route and the second route to the first network device by using the OSPF protocol.

In this embodiment of this application, the network segment corresponding to the second route includes a network segment corresponding to the first route, and the network segment corresponding to the first route includes the network segment corresponding to the third route. In other words, a mask length of the third route is greater than a mask length of the first route, and the mask length of the first route is greater than a mask length of the second route.

S102: The first network device sets an outbound interface of the first route to a null0 outbound interface.

In this embodiment of this application, after receiving the first route, the first network device may set the outbound interface of the first route to the null0 outbound interface. Specifically, in an implementation of this embodiment of this application, the first network device may set the outbound interface of the first route to the null0 outbound interface based on a first identifier, and the first identifier may be sent by the second network device to the first network device. For the first identifier, it should be noted that the first identifier may be sent by the second network device to the first network device by using another message independent of the first route, or may be added to the first route and sent to the first network device by the second network device. This is not specifically limited in this embodiment of this application. When the second network device sends the first route to the first network device by using the IS-IS protocol or the OSPF protocol, the second network device may add the first identifier to a field in an IS-IS packet or an OSPF packet.

It can be understood that, if the third route is deleted, because the first route is introduced, and the mask length of the first route is greater than the mask length of the second route, the first route may be obtained through matching based on the longest mask matching rule when the first network device performs route next-hop iteration. Because the outbound interface of the first route is a null0 outbound interface, after obtaining the first route through matching, the first network device may quickly determine that a next hop is unreachable, and the first network device may perform another operation, for example, switching to a backup next hop for route iteration, so that during packet forwarding, a packet forwarding path may be determined by using another route such as a backup route. This reduces a packet loss rate. For example, it can be understood with reference to FIG. 1 that, when route next-hop iteration is performed by using the next hop VPN SID A1:1:3::B100 of the VPN route, the first route, for example, A1:1::/48, is obtained through matching based on the longest mask matching rule. The outbound interface of the first route is a null0 outbound interface. Therefore, the PE device 101 considers that the next hop PE device 103 is unreachable, and triggers next hop switching to the PE device 104. That is, route next-hop iteration is performed by using the VPN SID, for example, A1:1:4::B100, of the PE device 104. If the iteration succeeds, when a packet is forwarded, the packet, for example, a common IPv4 packet from the CE device 105, is encapsulated into an SRv6 packet with the VPN SID A1:1:4::B100 corresponding to the PE device 104 as a destination address. This avoids a packet loss.

It can be learned from the foregoing description that, the outbound interface of the first route is a null0 outbound interface, and once the first route is obtained through matching, it is considered that the network segment corresponding to the first route is unreachable. However, the first route has a corresponding network segment, and if the first route includes a specific route in another management domain, the specific route in the other management domain is caused to be also unreachable. To avoid this problem, in an implementation of this embodiment of this application, the first route does not include a specific route in another management domain. That is, the first route does not include a specific route in a second IGP domain. The second IGP domain is another management domain different from a first IGP domain in which the first network device and the second network device are located, that is, the second IGP domain does not include a network device in the first IGP domain.

In an implementation of this embodiment of this application, the first network device may further receive a fourth route from a third network device. In the L3 VPN over SRv6 dual-homing scenario described above, an access side device such as the CE device 106 may be dual-homed to the third network device such as the PE device 104 and the second network device such as the PE device 103. In the FRR scenario shown above, the fourth route may be a backup route, determined by using an FRR method, of the third route. In this way, after obtaining the null0 outbound interface through matching, the first network device may further perform route next-hop switching, for example, may trigger route next-hop switching to the third network device, so that in a packet forwarding process, another route such as the fourth route may be used to determine a packet forwarding path, thereby implementing fast switching of a packet forwarding path, to effectively reduce a packet loss rate.

In addition to the manner of advertising an additional blackhole route, in this embodiment of this application, a manner of changing the third route to a blackhole route within a preset time period may also be used, to resolve a problem of a relatively high packet loss rate caused by introduction of an aggregated route. The following describes the communication method with reference to an accompanying drawing.

Figure 3:
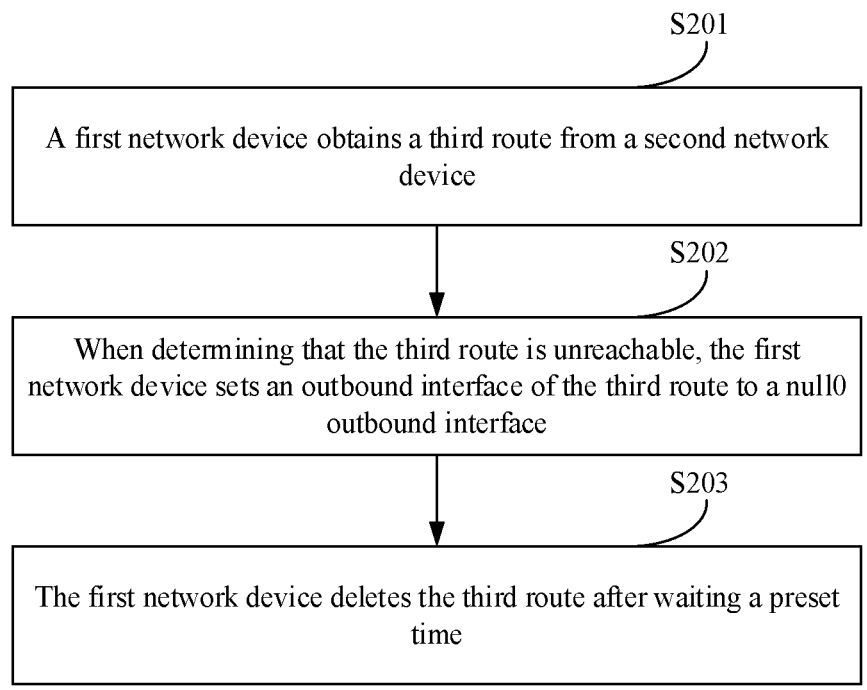
FIG. 3 is a schematic flowchart of a communication method according to an embodiment of this application.

FIG. 3 is a schematic flowchart of a communication method according to an embodiment of this application. The communication method provided in this embodiment of this application may be implemented, for example, by performing the following S201 to S203.

S201: A first network device obtains a third route from a second network device.

The third route may include a network segment route corresponding to an SRv6 SID, that is, a locator route, and the third route may be considered as a public network route.

For the third route, refer to the description part of the third route in the communication method shown in FIG. 2. Details are not described herein again. For the first network device and the second network device, refer to the related description part in the communication method shown in FIG. 2. Details are not described herein again.

As described above, in an L3VPN over SRv6 scenario, an SRv6 LSP needs to be established first, and a private network route needs to be learned by using a VPN instance. Therefore, the VPN instance is configured on both the first network device and the second network device, a BGP peer relationship is pre-established between the first network device and the second network device, and both the first network device and the second network device support the SRv6.

S202: When determining that the third route is unreachable, the first network device sets an outbound interface of the third route to a null0 outbound interface.

S203: The first network device deletes the third route after waiting a preset time.

As described above, in a conventional technology, once the first network device determines that the third route is unreachable, that is, the third route no longer exists in the first IGP domain, the third route is deleted. As a result, the first network device obtains a second route through matching based on a longest mask matching rule. The second route is an aggregated route introduced on the second network device. The first network device may receive the second route from the second network device, and a network segment corresponding to the second route includes a network segment corresponding to the third route. For the second route, refer to the description part of the foregoing related content. Details are not described herein again.

To resolve this problem, when determining that the third route is unreachable, the first network device does not immediately delete the third route, but first sets the outbound interface of the third route to the null0 outbound interface, and deletes the third route after waiting a preset time, for example, 10 seconds. In this way, within the preset time, because the third route is not deleted, a packet loss caused when a packet is matched with the aggregated route can be avoided, and the first network device can perceive, by using the outbound interface of the third route that is a null0 interface, that the next hop is unreachable, and replace the third route with another backup route that implements dual-homing access or FRR. After the preset time, the first network device can already perform connection interruption detection by using the BGP, and perceive that both a BGP route and a VPN route to the second network device are unreachable, so that a problem of a packet loss caused by the aggregated route does not exist.

Specifically, in an implementation of this embodiment of this application, when determining that the third route is unreachable, the first network device may set the outbound interface of the third route to the null0 outbound interface based on a second identifier. The second identifier may be sent by the second network device to the first network device. For the second identifier, it should be noted that the second identifier may be sent by the second network device to the first network device by using another message independent of the third route, or may be added to the third route and sent to the first network device by the second network device. This is not specifically limited in this embodiment of this application. When the second network device sends the third route to the first network device by using an IS-IS protocol or an OSPF protocol, the second network device may add the second identifier to a field in an IS-IS packet or an OSPF packet. In another possible implementation of this embodiment of this application, the first network device may obtain configuration information, and set the outbound interface of the third route to the null0 outbound interface when determining, based on the configuration information, that the third route is unreachable. The configuration information may be configured by management personnel, or may be delivered by another device. This is not specifically limited in this embodiment of this application.

It should be noted that the preset time may be, for example, carried in the second identifier, or may be determined in another manner, for example, preconfigured on the first network device. A specific value of the preset time may be determined based on an actual situation. This is not specifically limited in this embodiment of this application.

It can be learned from the foregoing description that, when the first network device forwards a packet, although the third route actually does not exist, the first network device still obtains the third route through matching. In addition, because the outbound interface of the third route is a null0 outbound interface, the third route essentially changes from the locator route or the loopback interface address route to a blackhole route. Correspondingly, after obtaining the third route through matching, the first network device may quickly determine that a next hop is unreachable, and the first network device may perform another operation, for example, switching to a backup next hop for route iteration, so that in a packet forwarding stage, the first network device may determine a packet forwarding path by using another route such as a backup route. This reduces a packet loss rate. For example, it can be understood with reference to FIG. 1 that, after determining that the third route, for example, the locator route A1:1:3::/64, is unreachable, the first network device sets an outbound interface of the locator route to a null0 outbound interface, that is, changes the locator route to a blackhole route, and deletes the locator route after waiting a preset time, for example, 10 seconds. In this way, when route next-hop iteration is performed by using the next hop VPN SID A1:1:3::B100 of the VPN route, the third route, for example, A1:1:3::/64, is obtained through matching based on the longest mask matching rule. The outbound interface of the third route is a null0 outbound interface. Therefore, the PE device 101 considers that the next hop PE device 103 is unreachable, and triggers next hop switching to the PE device 104. That is, route next-hop iteration is performed by using the VPN SID, for example, A1:1:4::B100, of the PE device 104. If the iteration succeeds, when a packet is forwarded, the packet, for example, a common IPv4 packet from the CE device 105, is encapsulated into an SRv6 packet with the VPN SID A1:1:4::B100 corresponding to the PE device 104 as a destination address. This reduces a packet loss rate.

In an implementation of this embodiment of this application, the first network device may further receive a fourth route from a third network device. In the L3 VPN over SRv6 dual-homing scenario described above, an access side device such as the CE device 106 may be dual-homed to the third network device such as the PE device 104 and the second network device such as the PE device 103. In the FRR scenario shown above, the fourth route may be a backup route, determined by using an FRR method, of the third route. In this way, after obtaining the null0 outbound interface through matching, the first network device may further perform route next-hop switching, for example, may trigger route next-hop switching to the third network device, so that in a packet forwarding process, another route such as the fourth route may be used to determine a packet forwarding path, thereby implementing fast switching of a packet forwarding path, to effectively reduce a packet loss rate.

Based on the method provided in the foregoing embodiment, an embodiment of this application further provides a corresponding communications apparatus. The following describes the communications apparatus with reference to an accompanying drawing.

Figure 4:
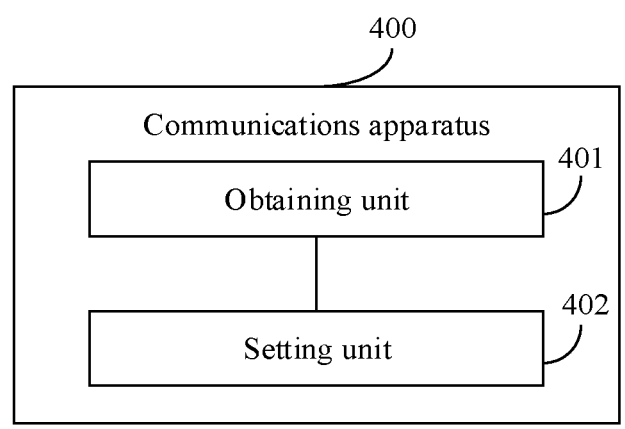
FIG. 4 is a schematic diagram of a structure of a communications apparatus according to an embodiment of this application.

FIG. 4 is a schematic diagram of a structure of a communications apparatus according to an embodiment of this application.

The communications apparatus 400 shown in FIG. 4 is configured to perform the communication method shown in FIG. 2 that is performed by the first network device in the foregoing method embodiment. Specifically, the communications apparatus 400 may include, for example, an obtaining unit 401 and a setting unit 402.

The obtaining unit 401 is configured to obtain a first route, a second route, and a third route from a second network device. The third route includes a network segment route corresponding to an SRv6 SID, the network segment corresponding to the third route is a subnet segment of a network segment corresponding to the first route, the network segment corresponding to the third route is a subnet segment of a network segment corresponding to the second route, and the network segment corresponding to the first route is a subnet segment of the network segment corresponding to the second route.

The setting unit 402 is configured to set an outbound interface of the first route to a null0 outbound interface.

In an implementation, the third route further includes a loopback interface address route.

In an implementation, the apparatus 400 further includes: a first receiving unit, configured to receive a first identifier from the second network device; and the setting unit 402 is specifically configured to: set the outbound interface of the first route to the null0 outbound interface based on the first identifier.

In an implementation, the communications apparatus 400 is applied to a first network device, and the first network device may be, for example, the first network device that performs the communication method shown in FIG. 2.

A VPN instance is configured on both the first network device and the second network device, a BGP peer relationship is pre-established between the first network device and the second network device, and both the first network device and the second network device support the SRv6.

In an implementation, the communications apparatus is applied to a first network device, the first network device and the second network device are located in a first IGP domain, and a second IGP domain does not include a network device in the first IGP domain, and the first route does not include a specific route located in the second IGP domain.

In an implementation, the obtaining unit 401 is specifically configured to: receive the first route, the second route, and the third route that are sent by the second network device by using an IS-IS protocol or an OSPF protocol.

In an implementation, the apparatus 400 further includes: a second receiving unit, configured to receive a fourth route from a third network device, where an access side device is dual-homed to the third network device and the second network device, or the fourth route is a backup route, determined by using a FRR apparatus, of the third route.

Because the apparatus 400 is an apparatus corresponding to the communication method shown in FIG. 2 that is provided in the foregoing method embodiment, a specific implementation of each unit of the apparatus 400 belongs to a same concept as that of the foregoing method embodiment. Therefore, for the specific implementation of each unit of the apparatus 400, refer to the description part of the communication method shown in FIG. 2 in the foregoing method embodiment. Details are not described herein again.

Figure 5:
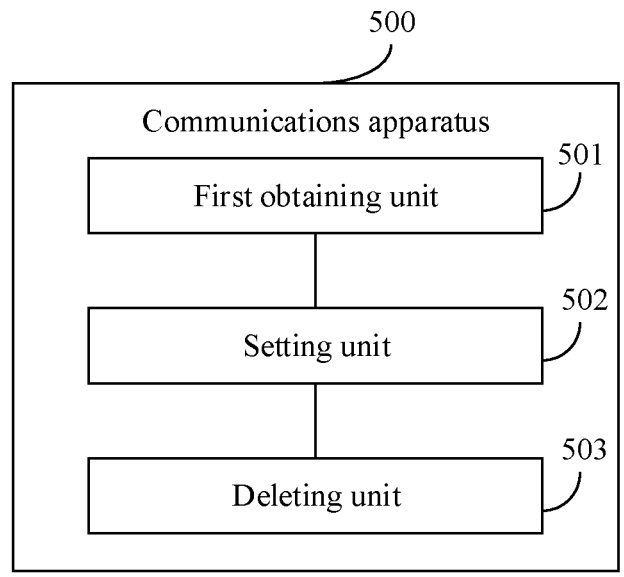
FIG. 5 is a schematic diagram of a structure of a communications apparatus according to an embodiment of this application.

FIG. 5 is a schematic diagram of a structure of a communications apparatus according to an embodiment of this application.

The communications apparatus 500 shown in FIG. 5 is configured to perform the communication method shown in FIG. 3 that is performed by the first network device in the foregoing method embodiment. Specifically, the communications apparatus 500 may include, for example, a first obtaining unit 501, a setting unit 502, and a deleting unit 503.

The first obtaining unit 501 is configured to obtain a third route from a second network device. The third route includes a network segment route corresponding to a segment identifier SRv6 SID of a segment routing Internet protocol version 6.

The setting unit 502 is configured to: when it is determined that the third route is unreachable, set an outbound interface of the third route to a null0 outbound interface.

The deleting unit 503 is configured to delete the third route after waiting a preset time.

In an implementation, the third route further includes a loopback interface address route.

In an implementation, the apparatus 500 further includes: a second obtaining unit, configured to obtain a second route from the second network device, where a network segment corresponding to the third route is a subnet segment of a network segment corresponding to the second route.

In an implementation, the communications apparatus is applied to a first network device, and the first network device may be, for example, the first network device that performs the communication method shown in FIG. 3. A VPN instance is configured on both the first network device and the second network device, a BGP peer relationship is pre-established between the first network device and the second network device, and both the first network device and the second network device support the SRv6.

In an implementation, the apparatus 500 further includes: a receiving unit, configured to receive a fourth route from a third network device, where an access side device is dual-homed to the third network device and the second network device, or the fourth route is a backup route, determined by using a FRR apparatus, of the third route.

Because the apparatus 500 is an apparatus corresponding to the communication method shown in FIG. 3 that is provided in the foregoing method embodiment, a specific implementation of each unit of the apparatus 500 belongs to a same concept as that of the foregoing method embodiment. Therefore, for the specific implementation of each unit of the apparatus 500, refer to the description part of the communication method shown in FIG. 3 in the foregoing method embodiment. Details are not described herein again.

An embodiment of this application further provides a communications device. The device includes a processor and a memory. The memory is configured to store a program. When the embodiment shown in FIG. 4 or FIG. 5 is implemented, and the units described in the embodiment shown in FIG. 4 or FIG. 5 are implemented by software, software or program code required for performing functions of the units in FIG. 4 or FIG. 5 is stored in the memory. The processor is configured to execute the program in the memory, to perform the communication method provided in the foregoing method embodiment and performed by the first network device, for example, perform the communication method corresponding to FIG. 2 that is provided in the foregoing method embodiment and performed by the first network device, or for another example, perform the communication method corresponding to FIG. 3 that is provided in the foregoing method embodiment and performed by the first network device. In some embodiments, the communications device may be the PE device 101 in FIG. 1.

Figure 6:
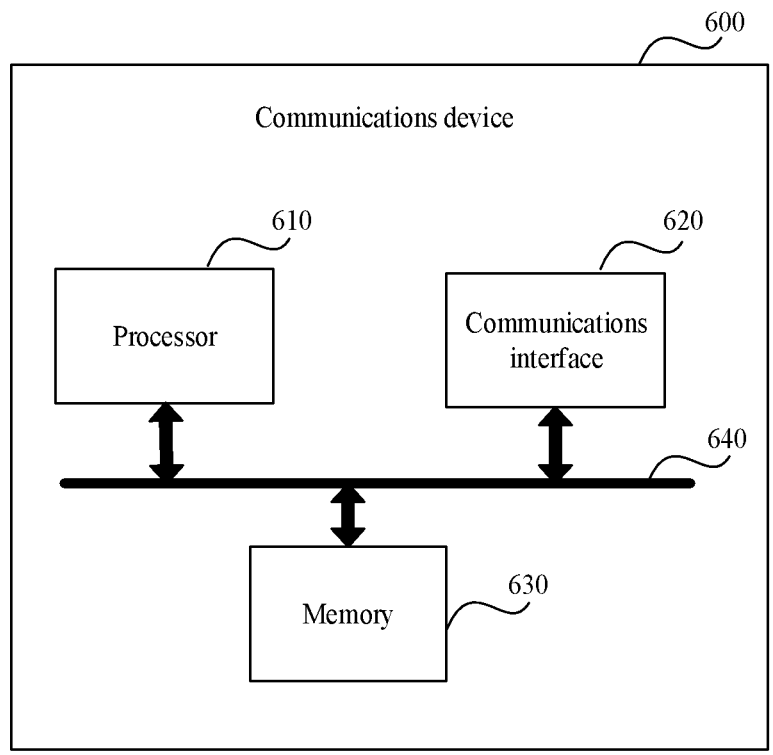
FIG. 6 is a schematic diagram of a structure of a communications device according to an embodiment of this application.

It should be noted that, a hardware structure of the communications device may be a structure shown in FIG. 6. FIG. 6 is a schematic structural diagram of a communications device according to an embodiment of this application.

Referring to FIG. 6, the communications device 600 includes a processor 610, a communications interface 620, and a memory 630. There may be one or more processors 610 in the communications device 600. One processor is used as an example in FIG. 6. In this embodiment of this application, the processor 610, the communications interface 620, and the memory 630 may be connected through a bus system or in another manner. In FIG. 6, an example in which the processor 610, the communications interface 620, and the memory 630 are connected through a bus system 640 is used.

The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 630 may include a volatile memory, for example, a random-access memory (RAM). The memory 630 may alternatively include a non-volatile memory, for example, a flash memory, a hard disk drive (HDD), or a solid-state drive (SSD). The memory 630 may further include a combination of the foregoing types of memories. The memory 630 may be configured to store a first route, a second route, a third route, and a fourth route.

Optionally, the memory 630 stores an operating system and a program, an executable module, or a data structure, or a subset thereof, or an extended set thereof. The program may include various operation programs, used to implement various operations. The operating system may include various system programs, to implement various basic services and process hardware-based tasks. The processor 610 may read the program in the memory 630, to implement the communication method provided in the foregoing embodiment of this application.

The bus system 640 may be a Peripheral Component Interconnect (PCI) bus, an Extended Industry Standard Architecture (EISA) bus, or the like. The bus system 640 may be classified into an address bus, a data bus, a control bus, and the like. For ease of representation, only one thick line is used to represent the bus in FIG. 6, but this does not mean that there is only one bus or only one type of bus.

In a specific embodiment, the processor 602 is configured to obtain a first route, a second route, and a third route from a second network device, where the third route includes a network segment route corresponding to a segment identifier SRv6 SID of a segment routing Internet protocol version 6, the network segment corresponding to the third route is a subnet segment of a network segment corresponding to the first route, the network segment corresponding to the third route is a subnet segment of a network segment corresponding to the second route, and the network segment corresponding to the first route is a subnet segment of the network segment corresponding to the second route; and set an outbound interface of the first route to a null0 outbound interface. For a detailed processing process of the processor 602, refer to detailed description of the embodiment shown in FIG. 2. Details are not described herein again.

In a specific embodiment, the processor 602 is configured to obtain a third route from a second network device, where the third route includes a network segment route corresponding to a segment identifier SRv6 SID of a segment routing Internet protocol version 6; when determining that the third route is unreachable, set an outbound interface of the third route to a null0 outbound interface; and delete the third route after waiting a preset time. For a detailed processing process of the processor 602, refer to the detailed description of the embodiment shown in FIG. 3. Details are not described herein again.

An embodiment of this application further provides a computer-readable storage medium, including a program. When the program runs on a computer, the computer is enabled to perform the communication method provided in the foregoing method embodiment and performed by the first network device, for example, perform the communication method corresponding to FIG. 2 that is provided in the foregoing method embodiment, or for another example, perform the communication method corresponding to FIG. 3 that is provided in the foregoing method embodiment.

An embodiment of this application further provides a computer program product including a program. When the program runs on a computer, the computer is enabled to perform the communication method provided in the foregoing method embodiment and performed by the first network device, for example, perform the communication method corresponding to FIG. 2 that is provided in the foregoing method embodiment, or for another example, perform the communication method corresponding to FIG. 3 that is provided in the foregoing method embodiment.

In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way is interchangeable in an appropriate circumstance, so that the embodiments described herein can be implemented in another order than the order illustrated or described herein. Moreover, terms "include", "comprise", and any other variants mean to cover non-exclusive inclusion, for example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a RAM, a magnetic disk, or an optical disc.

Persons skilled in the art should be aware that in the foregoing one or more examples, services described may be implemented by hardware, software, firmware, or any combination thereof. When the services are implemented by software, the services may be stored in a computer-readable medium or transmitted as one or more programs or code in a computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and benefits are further described in detail. It should be understood that the foregoing description is merely specific implementations.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A communication method implemented by a first network device, wherein the communication method comprises:
    obtaining, from a second network device, a first route and a second route, wherein a first prefix corresponding to the first route is longer than a second prefix corresponding to the second route, wherein the second route is an aggregated route, and wherein the first route indicates that the first prefix is unreachable; and
    switching, based on the first route, a next hop of the aggregated route from the second network device to a third network device, wherein either an access side device is dual-homed to the third network device and the second network device or a fourth route advertised by the third network device is a backup route of a third route advertised by the second network device.

2. The communication method of claim 1, further comprising setting an outbound interface of the first route to a null0 outbound interface.

3. The communication method of claim 2, further comprising receiving, from the second network device, a first identifier, wherein setting the outbound interface further comprises setting, based on the first identifier, the outbound interface of the first route to the null0 outbound interface.

4. The communication method of claim 1, further comprising:
    configuring a virtual private network (VPN) instance on both the first network device and the second network device; and
    pre-establishing a Border Gateway Protocol (BGP) peer relationship between the first network device and the second network device,
    wherein both the first network device and the second network device support Segment Routing over Internet Protocol version 6 (SRv6).

5. The communication method of claim 1, wherein the first network device and the second network device are located in a first Interior Gateway Protocol (IGP) domain, wherein a second IGP domain does not comprise a network device in the first IGP domain, and wherein the first route does not comprise a specific route located in the second IGP domain.

6. The communication method of claim 1, wherein obtaining the first route and the second route comprises receiving, from the second network device by using an Intermediate System-to-Intermediate System (IS-IS) protocol or an Open Shortest Path First (OSPF) protocol, the first route or the second route.

7. The communication method of claim 1, wherein the access side device is dual-homed to the third network device and the second network device.

8. A first network device comprising:
at least one processor; and
one or more memories coupled to the at least one processor and configured to store programming instructions, wherein the at least one processor is configured to execute the programming instructions to cause the first network device to:
obtain, from a second network device, a first route and a second route, wherein a first prefix corresponding to the first route is longer than a second prefix corresponding to the second route, wherein the second route is an aggregated route, and wherein the first route indicates that the first prefix is unreachable; and
switch, based on the first route, a next hop of the aggregated route from the second network device to a third network device, wherein either an access side device is dual-homed to the third network device and the second network device or a fourth route advertised by the third network device is a backup route of a third route advertised by the second network device.

9. The first network device of claim 8, wherein the programming instructions further cause the first network device to set an outbound interface of the first route to a null0 outbound interface.

10. The first network device of claim 9, wherein the programming instructions further cause the first network device to:
receive, from the second network device, a first identifier; and
set, based on the first identifier, the outbound interface of the first route to the null0 outbound interface.

11. The first network device of claim 8, wherein a virtual private network (VPN) instance is configured on both the first network device and the second network device, wherein a Border Gateway Protocol (BGP) peer relationship is pre-established between the first network device and the second network device, and wherein both the first network device and the second network device support Segment Routing over Internet Protocol version 6 (SRv6).

12. The first network device of claim 8, wherein the first network device and the second network device are located in a first Interior Gateway Protocol (IGP) domain, wherein a second IGP domain does not comprise a network device in the first IGP domain, and wherein the first route does not comprise a specific route located in the second IGP domain.

13. The first network device of claim 8, wherein the programming instructions cause the first network device to obtain the first route and the second route further comprises the programming instructions causing the first network device to receive, from the second network device, the first route and the second route by using an Intermediate System-to-Intermediate System (IS-IS) protocol or an Open Shortest Path First (OSPF) protocol.

14. The first network device of claim 8, wherein the access side device is dual-homed to the third network device and the second network device.

15. A network system comprising a first network device, wherein the first network device is configured to:
obtain, from a second network device, a first route and a second route, wherein a first prefix corresponding to the first route is longer than a second prefix corresponding to the second route, wherein the second route is an aggregated route, and wherein the first route indicates that the first prefix is unreachable; and
switch, based on the first route, a next hop of the aggregated route from the second network device to a third network device, wherein either an access side device is dual-homed to the third network device and the second network device or a fourth route advertised by the third network device is a backup route of a third route advertised by the second network device.

16. The network system of claim 15, wherein the first network device is further configured to set an outbound interface of the first route to a null0 outbound interface.

17. The network system of claim 16, wherein the first network device is further configured to:
receive, from the second network device, a first identifier; and
set, based on the first identifier, the outbound interface of the first route to the null0 outbound interface.

18. The network system of claim 15, wherein the first network device and the second network device are located in a first Interior Gateway Protocol (IGP) domain, wherein a second IGP domain does not comprise a network device in the first IGP domain, and wherein the first route does not comprise a specific route located in the second IGP domain.

19. The network system of claim 15, wherein the first network device is further configured to receive, from the second network device, the first route and the second route by using an Intermediate System-to-Intermediate System (IS-IS) protocol or an Open Shortest Path First (OSPF) protocol.

20. The network system of claim 15, wherein the first network device is further configured to switch the next hop from the second network device to a third network device, and wherein either an access side device is dual-homed to the third network device and the second network device, or a fourth route advertised by the third network device is a backup route of a third route advertised by the second network device.

* * * * *